United States Patent [19]

Walker

[11] Patent Number: 4,491,699
[45] Date of Patent: Jan. 1, 1985

[54] COMMUNICATION APPARATUS FOR HOSTILE ENVIRONMENTS

[75] Inventor: Martin J. Walker, Houston, Tex.

[73] Assignee: NL Industries, Inc., New York, N.Y.

[21] Appl. No.: 254,428

[22] Filed: Apr. 15, 1981

[51] Int. Cl.³ ............................ H04R 1/44; H04M 1/05
[52] U.S. Cl. .................... 179/156 R; 455/89
[58] Field of Search ............ 179/102, 156 R; 181/128; 455/89, 95, 100, 1 HI, 157, 1 DD, 1 UW, 1 MG, 1 VC

[56] References Cited

U.S. PATENT DOCUMENTS

| 3,174,129 | 3/1965 | Laughlin et al. | 179/157 |
|---|---|---|---|
| 3,258,534 | 6/1966 | Goldsworthy | 179/156 A |
| 3,268,854 | 8/1966 | Sato | 179/156 R |
| 3,370,236 | 2/1968 | Walker | 179/102 |
| 3,549,831 | 12/1970 | Forney | 455/100 |
| 3,586,977 | 6/1971 | Lustig | 455/89 |
| 3,588,359 | 6/1971 | Cribb | 455/89 |
| 3,889,190 | 6/1975 | Palmer | 455/100 |
| 3,890,475 | 6/1975 | Denhart | 179/156 A |
| 3,968,435 | 2/1975 | Stover | 455/100 |
| 4,017,797 | 4/1977 | Laessig | 455/89 |
| 4,152,553 | 5/1979 | White | 179/156 R |

OTHER PUBLICATIONS

"Dyna-Com 12", Layfayette Catolog 710, 1971, p. 456.
"Uni-Com", ITT Publication, 1980.
"Speak-Ezee," Scott ATO Publication, Jun. 1979.

Primary Examiner—Stafford D. Schreyer
Assistant Examiner—L. C. Schroeder
Attorney, Agent, or Firm—Browning, Bushman, Zamecki & Anderson

[57] ABSTRACT

A dual communication system is disclosed including a microphone for mounting for use by a wearer of a protective face mask, the output signal from the microphone being communicated to both a speaker system for local, audible broadcast and to a transmitter for remote broadcast by radio signal.

8 Claims, 7 Drawing Figures

COMMUNICATION APPARATUS FOR HOSTILE ENVIRONMENTS

BACKGROUND OF THE INVENTION

1. Field of the Invention

The present invention pertains to techniques for communication including radio communication and localized communication such as by loud speaker, for example. More particularly, the present invention relates to communication systems for use with protective head gear, and finds particular application to masks such as may be used in hostile environments, for example.

2. Prior Art

Masks are used in various circumstances, including industrial environments, to provide protection to the face and/or to provide a breathable atmosphere from a reservoir such as a compressed gas tank, for example, where only a toxic atmosphere is otherwise avaiable. In addition to industrial-type settings wherein toxic fumes may prevail in an area in which one or more workers must enter to perform needed tasks, air-supplied masks are utilized by fire fighters as protection against smoke and toxic fumes.

Since the typical mask used for protection as described covers the mouth of the wearer, voice communication from such a wearer is impaired, even across relatively short distances. It is known to fit such a mask with a microphone connected to an external loud speaker system carried by the mask wearer to operate as a public address type system for local communication between the mask wearer and other persons in the vicinity. Two or more mask-equipped individuals may be connected by cable in conjunction with the use of such speaker systems.

Another means of communication is known whereby individuals may wear headsets including transceivers complete with microphones. Such apparatus is useful for longer range communication. However, such headsets are currently incompatible with the use of facial masks. Consequently, though a mask may accommodate the wearing of such a headset for the purpose of the wearer receiving radio communication by means of the transceiver, the transceiver microphone may prove effectively useless since the mask wearer must speak through the mask to reach the microphone. Generally, such verbal communication is greatly impeded by the mask as noted above.

It is advantageous to provide a means of communication for use with protective facial masks whereby the wearer may communicate long distance by means of a transceiver, and may communicate locally by means of a public address type system, enabling the user to selectively operate the system without transmitting by way of the transceiver, and, further, maintaining the sealing integrity of the mask for the safety of the user.

SUMMARY OF THE INVENTION

Communications apparatus according to the present invention include a microphone received in, or mounted on, a face mask so that the wearer of the mask may speak into the microphone. The microphone is connected to an external speaker, including appropriate electronics such as an amplifier, for receiving and acoustically projecting the output of the microphone. The microphone is also connected to a transmitter for communicating the microphone output by means of radio signals. The transmitter may be part of a transceiver, in the form of a headset for example, worn by the user whereby two-way radio communication is available to the user.

To accomplish the microphone connections an interface harness is provided including cable and connectors, for example. The interface may also include impedance matching components so that the microphone may be connected to both the external speaker system and the transmitter at the same time. The microphone output may even be communicated by both the radio transmitter and the external speaker at the same time.

The mounting and connection of the microphone is accomplished without affecting the sealing integrity of the mask. The sealing integrity of the transceiver system may be maintained by utilizing appropriate connectors to communicate the interface to the transceiver electronics. A switch may be provided for permitting the user to selectively operate the transceiver as a receiver only.

DESCRIPTION OF PREFERRED EMBODIMENTS

Figure 1:
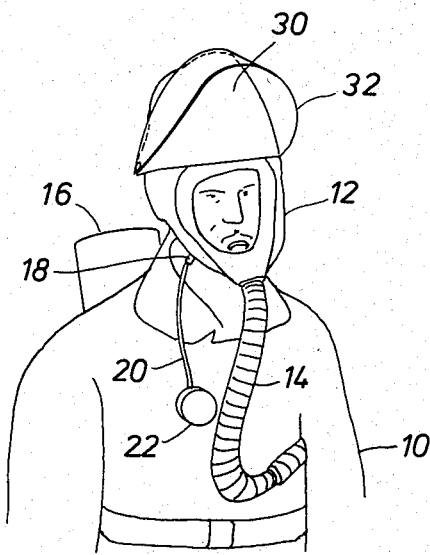
FIG. 1 is a perspective view of a user wearing a mask fitted with a microphone connected to an external speaker according to prior art.

In FIG. 1 a user 10 is shown wearing a protective face mask 12 connected by a flexible hose 14 to a breathable gas supply 16. In this prior art configuration, a microphone (not visible) is mounted within the face mask 12. A connector assembly 18 is fitted to the mask wall. The microphone within the mask is connected by appropriate leads to a coupling included in the assembly 18 and mounted and sealed in the mask bulkhead. The remainder of the assembly 18 includes a connector for coupling to the bulkhead-mounted fitting, and which is connected by an appropriate cable or other lead assembly 20 to an external speaker assembly 22.

Figure 2:
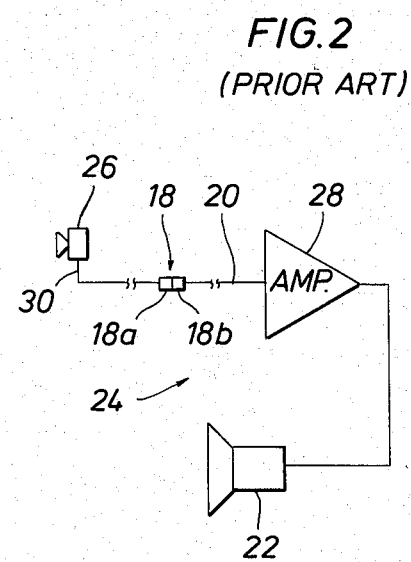
FIG. 2 is a schematic illustration of a circuit diagram showing certain components of the prior art communication system of FIG. 1.

In FIG. 2, the electronic components of the communication system of FIG. 1 are indicated generally at 24, and include the microphone 26 mounted within the mask 12, the speaker assembly 22 and an amplifier 28 which is used to amplify the output signals from the microphone to drive the external speaker, and may be part of the speaker assembly 22. As indicated in FIG. 2, the microphone 26 is joined by the lead 30 to the mask-mounted fitting 18a to which is selectively coupled the connector 18b mounted on the end of the cable 20 leading to the speaker amplifier 28, the fitting 18a and connector 18b being included within the coupling assembly 18. The user may thus speak into the microphone 26 with the mask in place as shown in FIG. 1, with the output of the microphone amplified and broadcast to the immediate surroundings by means of the speaker system 22. As illustrated, the mask with microphone mounted therein is compatible with the wearing of a protective hat 30 and even a protective visor 32 which may be lowered into place in front of the mask. The apparatus illustrated in FIGS. 1 and 2 is, however, limited to communications to those within hearing range of the speaker 22, and provides no enhanced communication reception by the user 10 other than, perhaps, the use by another nearby of a similar speaker output system.

Figure 3:
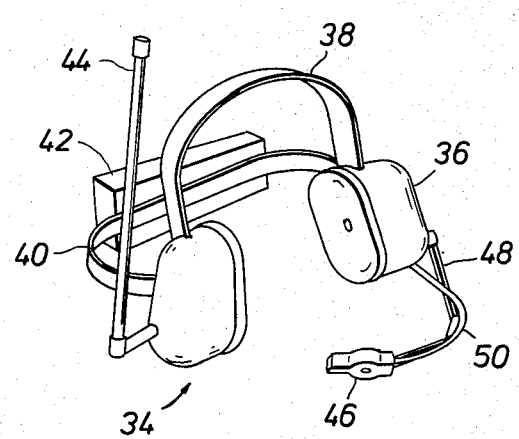
FIG. 3 is an illustration in perspective of a transceiver according to prior art.

FIG. 3 shows a prior art transceiver generally at 34 in the form of a headset. A pair of ear cups 36 are mounted on a crown strap 38 and further joined by a back strap 40 on which is mounted a casing 42. Receiver and transmitter electronics as well as a power supply, including batteries, are distributed throughout the casing 42 and the two ear cups 36. A transmitter and receiver antenna 44 extends from one of the ear cups 36, and a microphone 46 is mounted on an adjustable boom 48 extending from the other ear cup. An appropriate cable 50 joins the microphone 46 to the electronics of the transmitter contained in the transceiver system.

Figure 4:
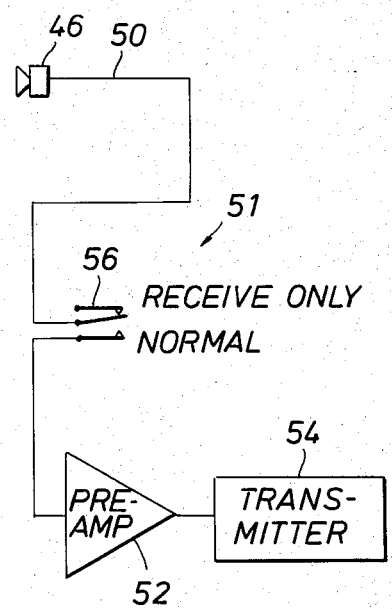
FIG. 4 is a schematic illustration of a circuit diagram showing certain components of the prior art communication system of FIG. 3.

The transmitter portion 51 of the electronics of the transceiver 34 is illustrated in FIG. 4, and includes the microphone 46 and lead cable 50, a preamplifier 52 and the transmitter circuitry proper 54. A switch 56 is provided whereby the microphone 46 may be disconnected from the transceiver electronics to allow the transceiver to be operated in a receive-only mode, as opposed to the normal mode of operation with the microphone connected to the transmitter 54. The switch 56 may be mounted on the ear cup 36 supporting the microphone boom 50.

It will be appreciated that the transceiver system 34 of FIGS. 3 and 4 permits a user to communicate by radio communication over extended distances, but does not amplify the user's voice locally, as by an external speaker. Further, the user may not effectively communicate by means of the external microphone 46 while the user is wearing a mask, such as that illustrated in FIG. 1, due to the muffling effect of the mask. Consequently, the two communications systems as illustrated in FIGS. 1-4 are effectively incompatible for achieving simultaneous local and long range communication.

Figure 5:
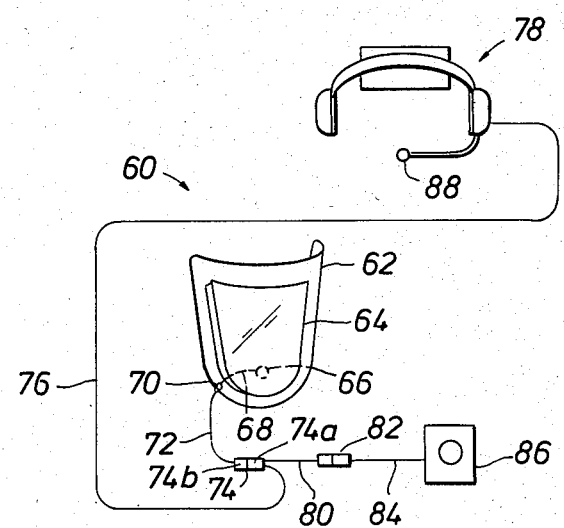
FIG. 5 is a diagram of a communication system according to the present invention, including a mask-mounted microphone, external speaker assembly, transmitter and interface harness.

In FIG. 5 a communication system according to the present invention is indicated generally at 60. A protective mask 62 with a visor 64 has mounted therein a microphone 66 connected by an appropriate lead 68 to a coupling assembly 70 which may be like the coupling assembly 18 of FIGS. 1 and 2, with a cable fitting 70a (see FIG. 6) sealingly mounted in the wall of the mask 62 and to which the lead lines 68 are appropriately joined. A second connector is selectively coupled to the wall-mounted fitting, and is mounted on an appropriate lead cable 72.

A coupling assembly 74, including two complementary connectors 74a and 74b, joins the lead cable 72 to a lead cable 76 extending to a transceiver 78, which may be a modification of the transceiver 34 of FIG. 3. The coupling assembly 74 is also joined to a second lead cable 80 which, by a coupling assembly 82 including connectors 82a and 82b, is connected to the lead lines 84 of an external speaker assembly 86 which may be like that of the communication system shown in FIG. 1. Alternatively, the lead cable 72 may be eliminated, and the coupler 74a of the connector assembly 74 joined directly to the connector of the assembly 70 fitted in the wall of the mask 62.

Figure 6:
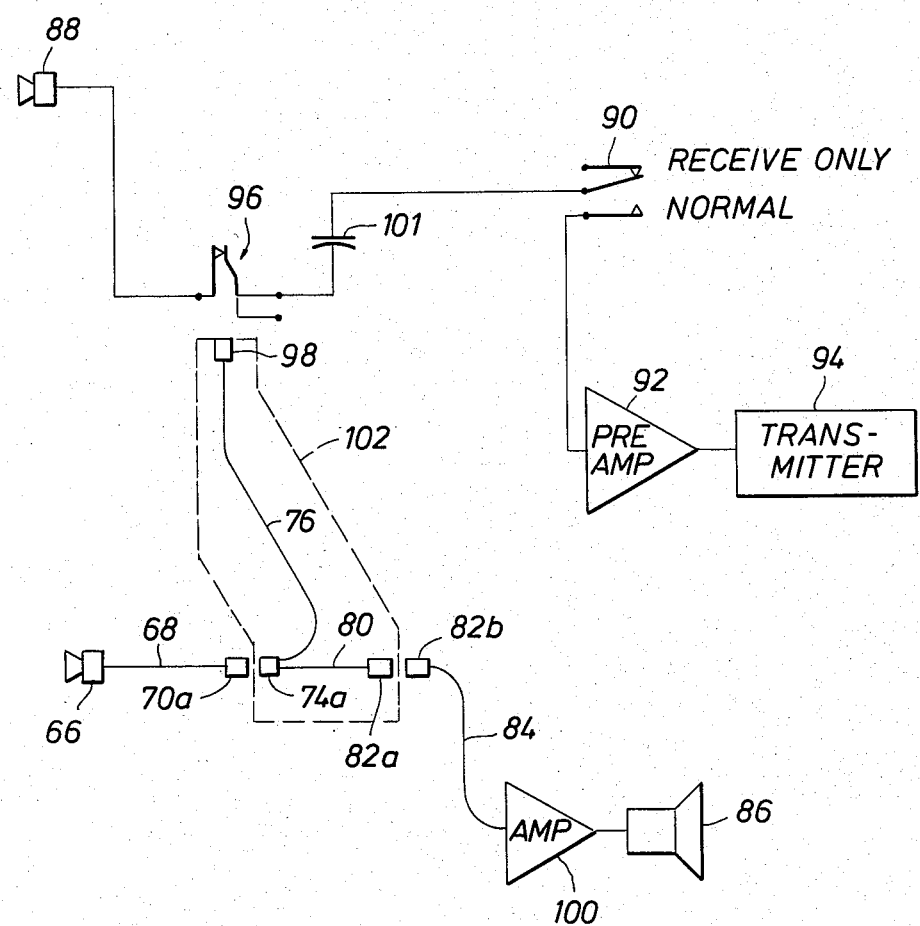
FIG. 6 is a schematic illustration of a circuit diagram of portions of the communication system of FIG. 5 according to the present invention.

Further details of the communication system of the present invention may be appreciated by reference to FIG. 6 wherein the connection of the mask microphone 66 to transceiver circuitry is illustrated. The transceiver 78 of FIG. 5 may be equipped with an external microphone 88 as in the case of the transceiver of FIG. 1. A receive only/normal (receive and transmit) switch 90 selectively connects the microphone circuitry to a preamplifier 92 whose output is communicated to a radio transmitter 94. A switching jack 96 is connected in series with the external microphone 88 to receive an appropriate plug 98 carried by the lead cable 76. The switching jack 96 maintains the external microphone 88 connected to the selector switch 90 without the plug 98 inserted in the jack. When the jack 98, which is connected ultimately to the internal mask microphone 66, is plugged into the switching jack 96, the connection between the external microphone 88 and the selector switch 90 is broken, and the lead cable 76 is connected to the switch 90, thereby permitting communication of signals from the mask microphone 66 to the transmitter 94.

An amplifier 100 amplifies the output signal from the mask microphone 66 for audible broadcast by the speaker assembly 86. A coupling capacitor 101 is included in the microphone connection circuit between the switching jack 96 and the selector switch 90 to provide DC isolation between the transmitter circuitry and the speaker circuitry, and also to provide impedance matching between those two components and the internal microphone 66 as well as the various lead cables.

In addition to the adaptation, if necessary, of transmitter circuitry and/or speaker assembly circuitry for compatability, the present invention provides an interface harness 102 which may constructed to include the cable segments 76 and 80, the connectors 74a and 82a and the plug 98. The interface harness 102 provides the means whereby the transmitter and the speaker circuitry are mutually connected and connected to the mask microphone 66. With such an arrangement, the user wearing the mask 62 may simultaneously transmit audible signals locally by means of the speaker assembly 86 and transmit radio signals effectively carrying the same information an indefinite distance by means of the transmitter 94. The selector switch 90 is available to selectively curtail radio transmissions while still permitting the user to receive radio signals by the receiver system of the transceiver 78. When the user removes the mask 62, the plug 98 may be removed from the switching jack 96 to re-connect the external transceiver microphone 88 to the transmitter 94 to enable the user to broadcast by means of radio waves. In such case, the external speaker 86 may not be necessary since the user would no longer have his local voice communication impeded by the mask.

Figure 7:
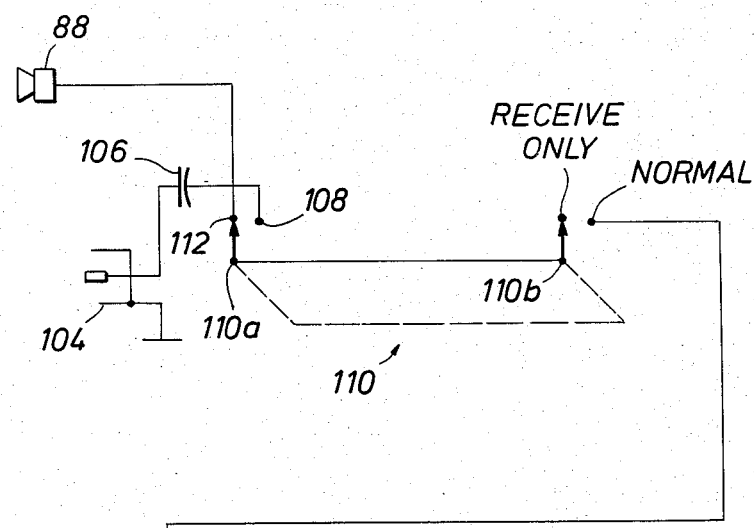
FIG. 7 is a schematic illustration of a circuit diagram showing a modification of the circuitry of the transmitter of FIGS. 5 and 6.
Figure 7:
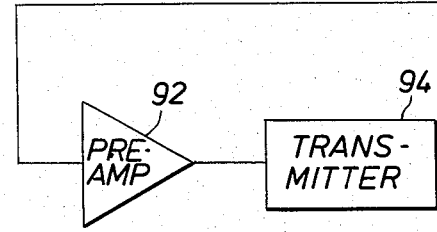

An alternative arrangement for connecting the cable 76 of the interface harness to the transmitter circuitry is illustrated in FIG. 7. It will be appreciated that some environments may be detrimental to electronic circuitry, which could be exposed to a harmful gaseous and/or particulate-laden atmosphere by the switching jack 96 (FIG. 6) which would provide an opening through the wall of an ear cup or the transceiver casing in which the jack would be mounted. In FIG. 7 a coaxial cable connector 104, which does not have a through opening, is provided rather than the switching jack 96. The lead cable 76 is then fitted with an appropriate complementary coaxial cable connector (not shown) for joining to the connector 104, the latter being mounted in and sealed to the wall of an ear cup or casing of the transceiver 78 (FIG. 5). A coupling capacitor 106 for DC isolation and impedance matching is connected to the central lead post of the connector 104, and, on the other side of the capacitor, is joined to a terminal 108 of a dual rotary concentric shaft switch 110, for example. To maintain the sealing integrity of the electronic circuitry the coupling capacitor 106 would be included within the ear cup or casing of the transceiver 78. The switch 110 may also be mounted in and sealed to an ear cup or casing of the transceiver 78 to maintain the sealed integrity of the electronic components.

A terminal 112 of the switch 110 alternate to the terminal 108 is connected to the external transceiver microphone 88. One shaft 110a of the rotary switch 110 may be operated to select between the mask microphone 66, connected by means of the connector 104, and the external microphone 88 to provide the output signal to the transmitter 94. A second shaft 110b of the dual switch 110 operates a selector switch to open or close the connection between either of the two microphones 88 and 66 (FIG. 5), and the preamplifier 92 and transmitter 94.

All of the microphones discussed herein may be voice-operated microphones.

The present invention provides a dual communication system whereby a user wearing a protective face mask fitted with a microphone may communicate locally by means of an amplifier/speaker and may communicate remotely by means of a radio transmitter which may be part of a transceiver. The user may selectively disconnect the radio transmission portion of the communication output. Additionally, the amplifier/speaker portion of the communication system may be disconnected from the mask microphone by appropriate cable coupler disconnection. It would also be appreciated from the present disclosure that the isolation of the amplifier/speaker from the transmitter may be accomplished by means other than those illustrated, such as by adding a capacitor to the amplifier input of the speaker for example.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. Communication apparatus for use with facial covering comprising:

a. first microphone means for mounting relative to such facial covering for use by a wearer of said facial covering;
   b. transmitter means;
   c. external speaker means;
   d. connection means, including cable means and connector means, whereby the output of said first microphone means may be communicated to said external speaker means and to said transmitter means;
   e. second microphone means external to said facial covering; and
   f. receptacle means included in said transmitter means for receiving said cable and connector means from said first microphone means;
   g. wherein said receptacle means is movable between a first configuration, in which said receptacle means does not receive said cable and connector means and does provide communication between said second microphone means and said transmitter means, and a second configuration in which said receptacle means receives said cable and connector means and interrupts said communication from said second microphone means to said transmitter means.

2. Apparatus as defined in claim 1 further comprising receiver means.

3. Apparatus as defined in claim 1 further comprising amplifier means for receiving said output from said first microphone means and amplifying said output before communication to said external speaker means.

4. Apparatus as defined in claim 1 wherein said communication means may be sealed to said transmitter means.

5. Communication apparatus for use with facial coverings comprising:

a. microphone means for mounting relative to such facial covering for use by a wearer of said facial covering;
   b. transmitter means;
   c. external speaker means;
   d. connection means, including cable means and connector means, whereby the output of said microphone means may be communicated to said external speaker means and to said transmitter means; and
   e. switch means whereby said transmitter means may be selectively joined to said cable and connector means for reception of said microphone means output, and may be selectively connected to second microphone means external to said facial covering for receipt of output from said second microphone means.

6. Apparatus as defined in claim 5 further comprising receiver means.

7. Apparatus as defined in claim 5 further comprising amplifier means for receiving said output from said microphone means and amplifying said output before communication to said external speaker means.

8. Apparatus as defined in claim 5 wherein said communication means may be sealed to said transmitter means.

* * * * *